R. E. DIAL.
TRANSMISSION.
APPLICATION FILED APR. 12, 1915.
1,164,481.
Patented Dec. 14, 1915.
2 SHEETS—SHEET 2.
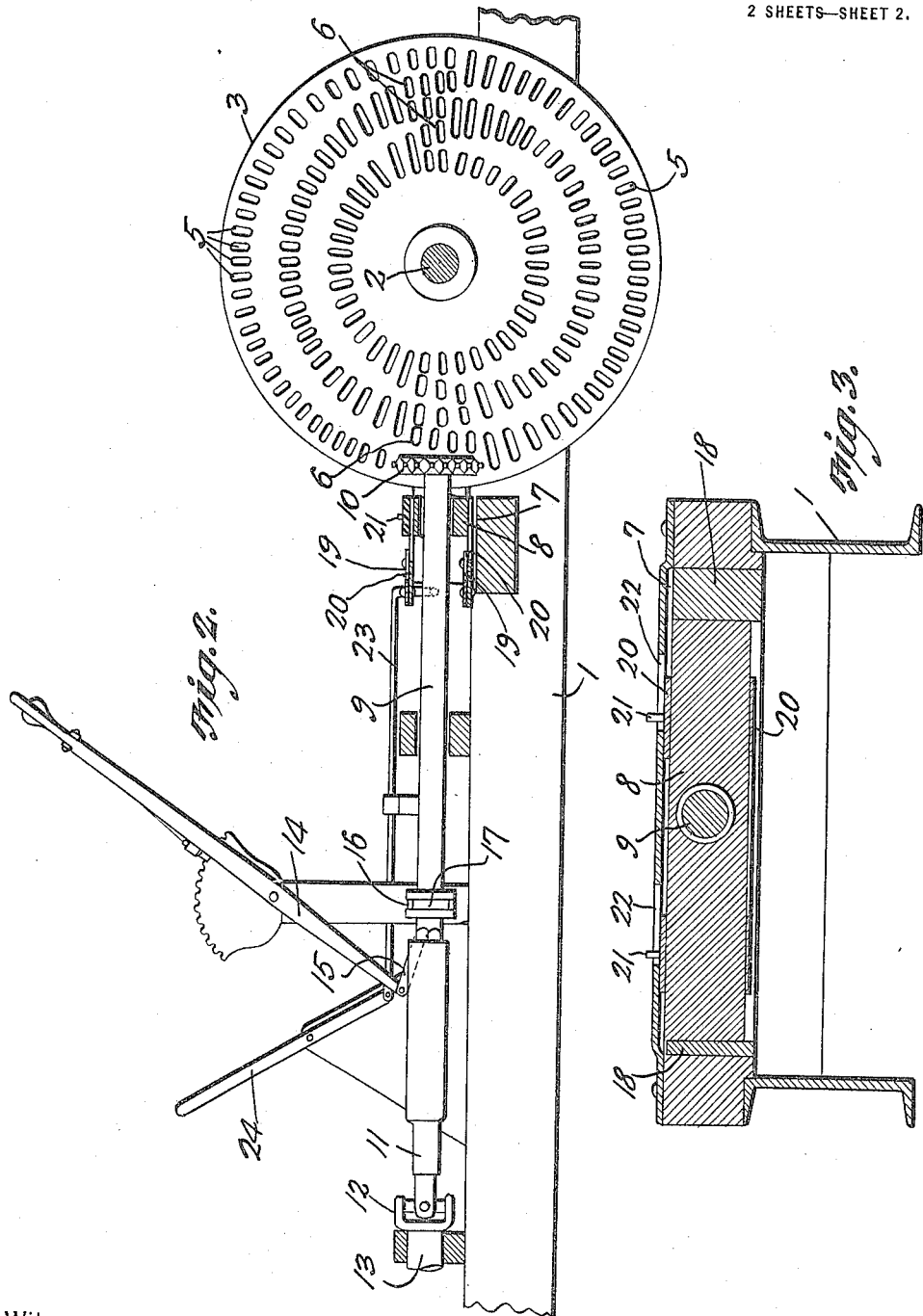
Witnesses
R. E. Dial  Inventor
by           Attorneys

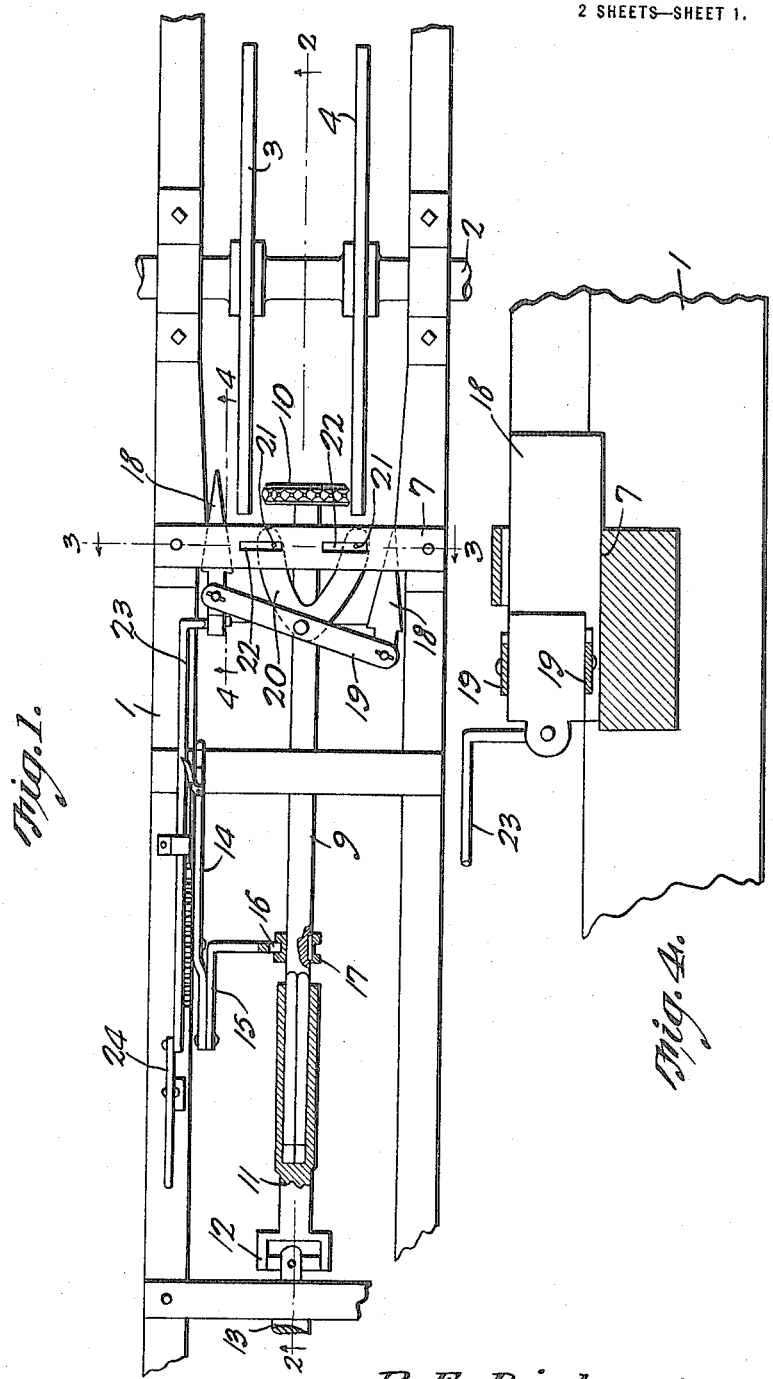

UNITED STATES PATENT OFFICE.

ROBERT E. DIAL, OF ATHERTON, INDIANA.

TRANSMISSION.

1,164,481.  Specification of Letters Patent.  Patented Dec. 14, 1915.

Application filed April 12, 1915. Serial No. 20,793.

*To all whom it may concern:*

Be it known that I, ROBERT E. DIAL, a citizen of the United States, residing at Atherton, in the county of Vigo and State of Indiana, have invented a new and useful Transmission, of which the following is a specification.

The present invention appertains to speed change gearing or transmissions, and aims to provide a novel and improved transmission gearing whereby the driven element may be rotated at various speeds relative to the driving element, and whereby the device may be changed from one speed to the other without stopping, or without stopping the engine or opening the clutch.

Another object of the invention is to provide a transmission gearing embodying a unique assemblage of the component parts, whereby the device operates in a thoroughly practical and efficient manner, the device also being comparatively simple and inexpensive in construction, as well as being durable and convenient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:—

Figure 1 is a plan view of the improved mechanism, portions being broken away. Fig. 2 is a longitudinal section taken on the line 2—2 of Fig. 1. Fig. 3 is an enlarged cross section taken on the line 3—3 of Fig. 1. Fig. 4 is an enlarged sectional detail taken on the line 4—4 of Fig. 1.

In carrying out the invention, there is provided a suitable frame or support 1, upon which is journaled a transverse shaft 2 having a pair of disks 3 and 4 keyed or otherwise secured thereon. Each of the disks 3 and 4 is provided with a plurality of annular series of apertures 5 which are concentric, and each of the disks is provided with oppositely extending series of apertures or openings 6 between the annular series of apertures 5. The apertures 6 extend along spiral lines between the respective series of apertures 5. Each of the disks may be provided with a number of the annular series of apertures 5, according to the number of speed changes desired.

A transverse guide 7 is carried by the frame 1 adjacent the peripheries of the disks 3 and 4, and a slidable bearing 8 is movable transversely in the guide 7. A shaft 9 is journaled through the bearing 8, and is provided between the disks 3 and 4 with a pinion 10 having an annular series of peripheral lugs adapted to work properly in the apertures 5 and 6 of the disks.

That end of the shaft 9 remote from the disks is telescopically engaged to a shaft 11 to rotate therewith, and the shaft 11 is connected by a universal joint 12 with the driving shaft 13. The drive shaft 13 is connected to the engine or prime mover in any suitable manner, and the shaft 2 in the present case is the driven element, but the same may be connected in any suitable manner to another shaft or device for driving the same.

Means is provided for shifting the shaft 9 longitudinally, and to this end a hand lever 14 is fulcrumed to the frame, and has a bar 15 pivoted thereto which is provided with a fork 16 engaging a grooved collar 17 secured upon the shaft 9, whereby when the lever 14 is swung it will move the shaft 9 longitudinally.

A mechanism is employed for shifting the pinion 10 laterally into and out of engagement with the disks 3 and 4, and to this end a pair of wedges 18 are disposed between the ends of the bearing 8 and the ends of the guide 7, and have their smaller ends projecting toward the shaft 2 of the disks 3 and 4. Upper and lower levers 19 have their ends or arms pivoted to the larger ends of the wedges 18, and have their intermediate portions pivoted to V-shaped brackets 20 which are terminally secured to the bearing 8. The bearing is preferably provided with a pair of upstanding pins 21 which work in elongated slots 22 provided in the upper portion of the guide 7, for properly guiding the bearing 8. A link 23 connects one wedge 18 and a hand lever 24 which is fulcrumed upon the frame 1. When the lever 24 is swung in one direction one wedge 28 is projected between one end of the guide 7 and the respective end of the bearing 8, while the other wedge is retracted from between the other ends of the guide and bearing, for shifting the bearing 8 to one side, and when the lever 24 is moved in the opposite direction the operation will be reversed for moving the bearing 8 toward the other side.

In operation, supposing the pinion 10 to be engaged to one annular series of apertures 5 of one disk, the shaft 9 in being rotated with the driving shaft 18, will rotate the corresponding disk for driving the shaft 2. The speed may be readily changed, without stopping the operation of any of the parts, by swinging the lever 14 to move the shaft 9 in the desired direction either toward or away from the shaft 2, and the pinion 10 will follow the proper series of apertures 6 and run into the next annular series of apertures 5. The apertures 6 are so arranged that the pinion 10 may move in either direction from one annular series of apertures 5 to the other, and the apparatus may thus be readily manipulated for setting the same from one speed to the other, without an interruption in the operation of the mechanism. When the pinion 10 is engaged to one disk it will rotate the shaft 3 in one direction, and when the pinion 10 is shifted into engagement with the other disk, the shaft 2 will be rotated in the opposite direction, whereby the driven shaft or element 2 may be rotated in opposite directions. The shifting of the pinion 10 is accomplished by swinging the hand lever 24, which in causing the wedges 18 to move in opposite directions between the ends of the bearing and guide will shift the bearing 8 properly for moving the pinion into engagement with one or the other of the disks. When the hand lever 24 is moved to an intermediate position, the pinion 10 will be moved to a neutral position between the disks so as to be disengaged from both disks, and to thereby break the connection between the driving and driven elements. Thus, by controlling the levers 14 and 24 the mechanism may be properly set according to the speed desired, and the direction of movement of the driven element.

The present transmission gearing is adapted particularly for use on automobiles or motor vehicles, whereby the rear axle may be connected to the shaft 2 in a suitable manner to be driven at various speeds and in either direction. The transmission, however, may be employed for various other purposes and may be altered within its construction, within the scope of the appended claim, in adapting it to various environments.

Having thus described the invention, what is claimed as new is:—

In a transmission gearing, a frame, a transverse shaft journaled thereto, a pair of disks carried by said shaft within the frame, a transverse guide carried by the frame adjacent said disks, a longitudinal shaft journaled to the frame, a shaft having a universal joint with the second mentioned shaft, a shaft having a telescopic connection with the third mentioned shaft and having a pinion between and alternately engageable with said disks, a bearing movable in said guide, the fourth mentioned shaft being slidable through said bearing, a collar upon the fourth mentioned shaft, a hand lever carried by the frame and operatively connected to said collar for shifting the fourth mentioned shaft longitudinally, a pair of wedges between the ends of the bearing and guide, a bracket carried by the guide, a lever fulcrumed upon said bracket and pivoted to the larger ends of the wedges, and a hand lever carried by the frame and operatively connected to one of said wedges.

In testimony that I claim the foregoing as my own, I have hereto affixed my signature in the presence of two witnesses.

ROBERT E. DIAL.

Witnesses:
 LLOYD DIAL,
 ELLIOTT DIAL.

Copies of this patent may be obtained for five cents each, by addressing the "Commissioner of Patents, Washington, D. C."